United States Patent
Carlsson et al.

(10) Patent No.: US 6,674,728 B2
(45) Date of Patent: Jan. 6, 2004

(54) METHOD AND DEVICE FOR UTILIZING FREQUENCY BANDWIDTH IN A WIRELESS COMMUNICATION SYSTEM WITH ASYMMETRICAL TRAFFIC LOAD

(75) Inventors: Erik Carlsson, Mölndal (SE); Göran Snygg, Partille (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 212 days.

(21) Appl. No.: 09/972,984

(22) Filed: Oct. 10, 2001

(65) Prior Publication Data

US 2002/0044541 A1 Apr. 18, 2002

(30) Foreign Application Priority Data

Oct. 12, 2000 (SE) .............................................. 0003669

(51) Int. Cl.$^7$ ................................................. H04J 1/00
(52) U.S. Cl. ...................................... 370/281; 370/330
(58) Field of Search ............................... 370/276, 277, 370/278, 279, 280, 281, 282, 294, 295, 314, 329, 330, 336, 343, 345

(56) References Cited

U.S. PATENT DOCUMENTS 5,633,862 A * 5/1997 Suzuki et al. ............... 370/280
6,212,172 B1 * 4/2001 Barabash et al. ........... 370/277
6,356,540 B1 * 3/2002 Kojiro .......................... 370/330
6,553,078 B1 * 4/2003 Åkerberg ..................... 375/267

FOREIGN PATENT DOCUMENTS

| EP | 0 700 225 A2 | 3/1996 |
| EP | 1 065 897 A1 | 1/2001 |
| GB | 2 332 818 A | 6/1999 |

* cited by examiner

Primary Examiner—Kwang B. Yao
(74) Attorney, Agent, or Firm—Nixon & Vanderhye, P.C.

(57) ABSTRACT

The invention relates to a method for utilizing the available bandwidth in a wireless communication system that comprises a first (ANB) and a second (C/D) communication device intended to transmit information to each other, where each device (A/B; C/D) simultaneously can transmit on a first frequency and receive on a second frequency. Based on the need of the respective devices to transmit information within a particular interval of time, the said interval of time is divided up into a number of sub-intervals, the first device simultaneously transmitting on both the first and the second frequencies within a number of the said sub-intervals, and the second device simultaneously receiving on both the first and the second frequencies during these sub-intervals. The invention also relates to devices and modules intended to be incorporated in such a system.

12 Claims, 9 Drawing Sheets

| Case 1. f1=f3, f2=f4 | | | |
|---|---|---|---|
| | Tx | Rx | |
| A | f1 | | |
| B | | f2 | |
| C | | f3 | |
| D | f4 | | |

| Case 2. f1=f3, f2=f4 | | | |
|---|---|---|---|
| | Tx | Rx | |
| A | | f1 | |
| B | f2 | | |
| C | f3 | | |
| D | | f4 | |

| Case 3. f1=f3, f2=f4 | | | |
|---|---|---|---|
| | Tx | Rx | |
| A | f1 | | |
| B | f2 | | |
| C | | f3 | |
| D | | f4 | |

| Case 4. f1=f3, f2=f4 | | | |
|---|---|---|---|
| | Tx | Rx | |
| A | | f1 | |
| B | | f2 | |
| C | f3 | | |
| D | f4 | | |

METHOD AND DEVICE FOR UTILIZING FREQUENCY BANDWIDTH IN A WIRELESS COMMUNICATION SYSTEM WITH ASYMMETRICAL TRAFFIC LOAD

TECHNICAL FIELD

The present invention relates to a system and a method for improved utilization of available frequency bandwidth in a wireless communication system with asymmetrical traffic load. The invention also relates to devices that are intended to be incorporated in such a system.

BACKGROUND ART

In traditional communication systems for wireless communication between two or more devices, there are often equally large frequency ranges reserved for transmission and for reception in each device. Examples are systems with so-called frequency duplex, in other words systems in which the incorporated devices can transmit and receive simultaneously at two different frequency ranges. An example of such a system is the so-called NMT system. In such a system, each device transmits on one of its frequency ranges and receives on the other, and when two devices are communicating with each other it is the case that the transmission range of one device corresponds to the reception range of the other device, and vice versa.

For the transmission of speech, in principle equally large amounts of information are transmitted in both directions, which means that each device utilizes its allocated frequency range to an equally large extent. When the amount of data traffic increases in such systems, however, an imbalance arises in the utilization of the allocated bandwidth, as then it can often be the case that one of the communicating devices transmits considerably more than it receives, while the other device consequently receives considerably more than it transmits.

The bandwidth that is reserved in order for the receiving device to be able to transmit (and in order for the transmitting device to be able to receive) is consequently poorly utilized, while at the same time the transmission of the amounts of data involved takes a relatively long time.

A method for achieving improved utilization of available bandwidth in a system with asymmetrical transmission requirements is to utilize so-called time-division or time multiplexing, which means that the devices transmit on the same frequency at different times and for as long a time as is required in order for the information to be transmitted. A disadvantage of this solution is that the frequency duplex capability is lost. A further disadvantage of this type of solution is that the frequency-allocating authorities often require reception to take place on one frequency range and transmission on another, which requirement cannot be met in purely time-multiplexed systems.

DISCLOSURE OF INVENTION

There is thus a need to be able to utilize bandwidth reserved for transmission and reception in a device in a wireless communication system on occasions when the device does not require the bandwidth that has been reserved for reception or transmission, while at the same time retaining the frequency duplex capability.

This need is solved according to the present invention by means of a first communication device intended for communication with a second communication device, which first device is provided with means for simultaneously transmitting on a first frequency and receiving on a second frequency. Based on the need of the respective devices to transmit information within a particular interval of time, the first device is provided with means for dividing up the said interval of time into a number of sub-intervals in conjunction with corresponding means in the second device, the first unit being provided with means for simultaneously transmitting on both the first and the second frequencies.

The invention also comprises a first communication device for communication with a second communication device, which first device is provided with means for simultaneously transmitting on a first frequency and receiving on a second frequency, which first device, based on the need of the respective devices to transmit information to the other device within a particular interval of time, is provided with means for dividing up the said interval of time into a number of sub-intervals in conjunction with corresponding means in the second device, the first device being provided with means for simultaneously receiving on both the first and the second frequencies.

This provides a very high level of flexibility, as one and the same device can utilize its allocated bandwidth adaptively as required, either for simultaneously transmitting and receiving, or only transmitting, or only receiving, according to the actual requirement.

A further advantage of a device according to the invention is that it can be used together with devices that transmit and receive simultaneously and also with equipment that transmits and receives alternatively. This means that a device according to the invention can be used together with equipment from existing systems and also with equipment in accordance with future systems, while at the same time older types of equipment can be incorporated into systems that mainly comprise devices according to the invention.

The devices according to the invention can advantageously be combined to create a communication system comprising a first and a second communication device intended for transmitting information to each other, where each device comprises means for simultaneously transmitting on a first frequency and receiving on a second frequency, the first and the second devices, based on the need of the respective devices to transmit information within a particular interval of time, both being provided with means for dividing up the said interval of time into a number of sub-intervals in conjunction with each other, the first device comprising means for simultaneously transmitting on both the first and the second frequencies within a number of the said sub-intervals and the second device comprising means for simultaneously receiving on both the first and the second frequencies within these sub-intervals.

BRIEF DESCRIPTION OF DRAWINGS

In the following, the invention will be described in greater detail, with reference to the attached figures, in which.

MODES FOR CARRYING OUT THE INVENTION

The invention will be described in detail below, with reference to a number of examples, all of which illustrate the invention used for wireless communication. The invention can also be used, however, for other types of communication system where there is a desire to utilize better the available bandwidth.

Figure 1:
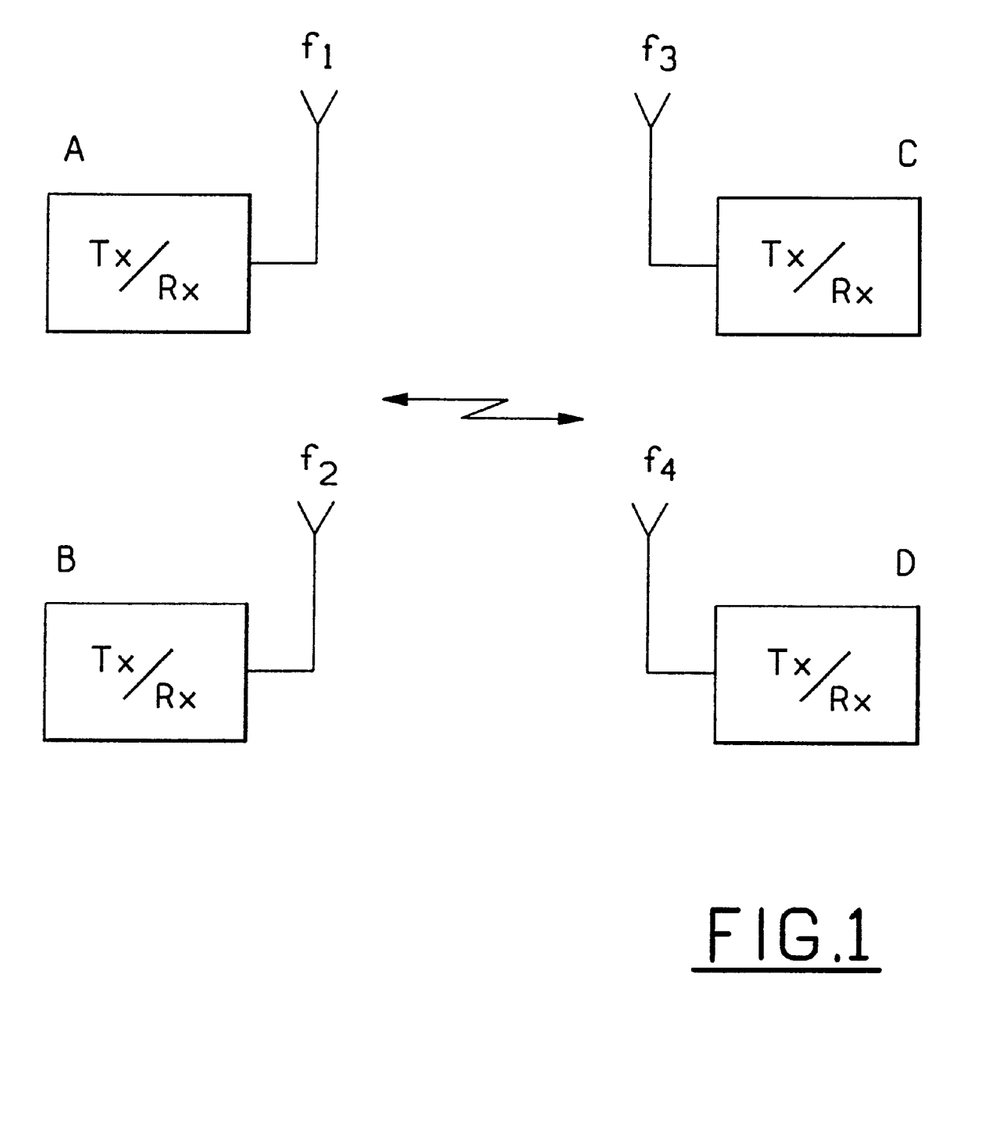
FIG. 1 shows an example of a communication system according to the invention.

FIG. 1 shows an example of a communication system 100 constructed with devices according to the invention. The system in the figure comprises four modules A, B, C, D, which in groups of two devices A/B; C/D form each end of a connection. Each module A, B, C, D comprises both a transmitter and a receiver, which can transmit and receive on a particular frequency, with a particular bandwidth and a particular maximal transmission capacity. The various modules transmit/receive on frequencies designated as follows in the description and in the figures:

A-$f_1$
B-$f_2$
C-$f_3$
D-$f_4$

The fact that a module A, B, C, D according to the invention comprises both a transmitter and a receiver means that a system according to the invention has great flexibility regarding the utilization of the bandwidth which is available to the system. This will be described below, using a number of examples of various configurations that are possible for the system.

In one possible configuration of the system in FIG. 1, the modules A and D are transmitting at the same time as the modules B and C are receiving, which in other words means that the transmitters in A and D are active at the same time as the receivers in B and C are active. The transmitting modules transmit with a particular bandwidth, centred around a particular mid frequency in this bandwidth. The mid frequency for a transmitting module corresponds to the mid frequency for the receiving module to which it transmits information, in other words, the modules A and C, B and D have the same mid frequencies. This configuration, with equal amounts of transmission and reception in both directions, works well in applications such as speech, where in principle equal amounts of information are to be transmitted. In other types of application, for example the transmission of data, however, the need to transmit information can be very much greater for one transmitter than for the other, which means that the bandwidth that is available for one transmitter will be poorly utilized, while at the same time the information that is to be transmitted from the other transmitter will be transmitted slowly on account of restricted bandwidth.

Figure 2:
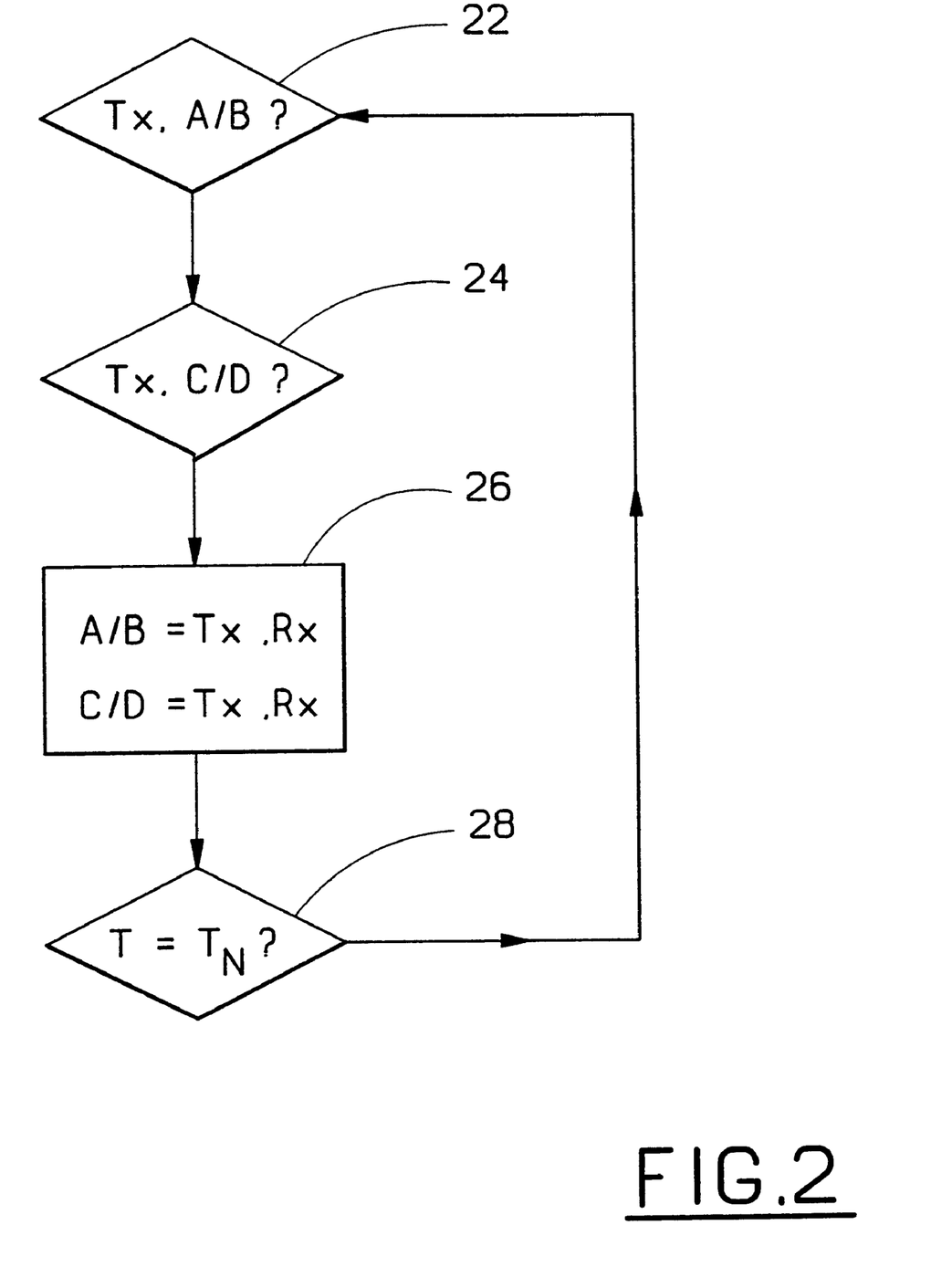
FIG. 2 shows a simplified flow chart of a possible way of implementing the invention.

In a system like the one in FIG. 1, with devices according to the invention, the available bandwidth can be utilized by activating/deactivating transmitters or receivers in the various modules adaptively. The activation or deactivation can be controlled in a number of different ways, which will be described in greater detail below. One method for utilizing bandwidth by means of the system is shown in overview in the flow chart in FIG. 2, which has the following main steps:

First, the need is investigated for transmitting information for the various devices (boxes 22, 24) which in FIG. 1 consist of the modules A and B, C and D respectively. The investigated need should relate to a particular determined interval of time, T,-TN, after which the need is investigated again (box 28). Based on the need of the respective devices to transmit information, in other words their need for bandwidth during the interval of time concerned, the various modules can be configured in such a way as best to utilize the need for bandwidth of the total system (box 26), by the transmitter or receiver of the respective device being activated/deactivated during all or parts of the interval of time.

After the end of the interval of time, there is a new investigation for the next period, and the procedure in FIG. 2 is repeated for as long a time as is required.

In order to clarify further how a system with devices according to the invention can be utilized, the following example can be used: during one of the intervals of time described above, the need of the first device A/B to transmit information is less than a particular predetermined limit, while at the same time the need of the other device C/D to transmit information during the same interval of time exceeds a second predetermined limit. In order to utilize the bandwidth that is available to the system, the receivers in the modules in the first group, A and B, are activated, while at the same time the transmitters in the modules in the second group, C and D, are activated. In this way, all available bandwidth will be utilized to transmit data from C and D to A and B. Using the frequency designations above, $f_1=f_3$ and $f_4=f_2$.

Figure 3:
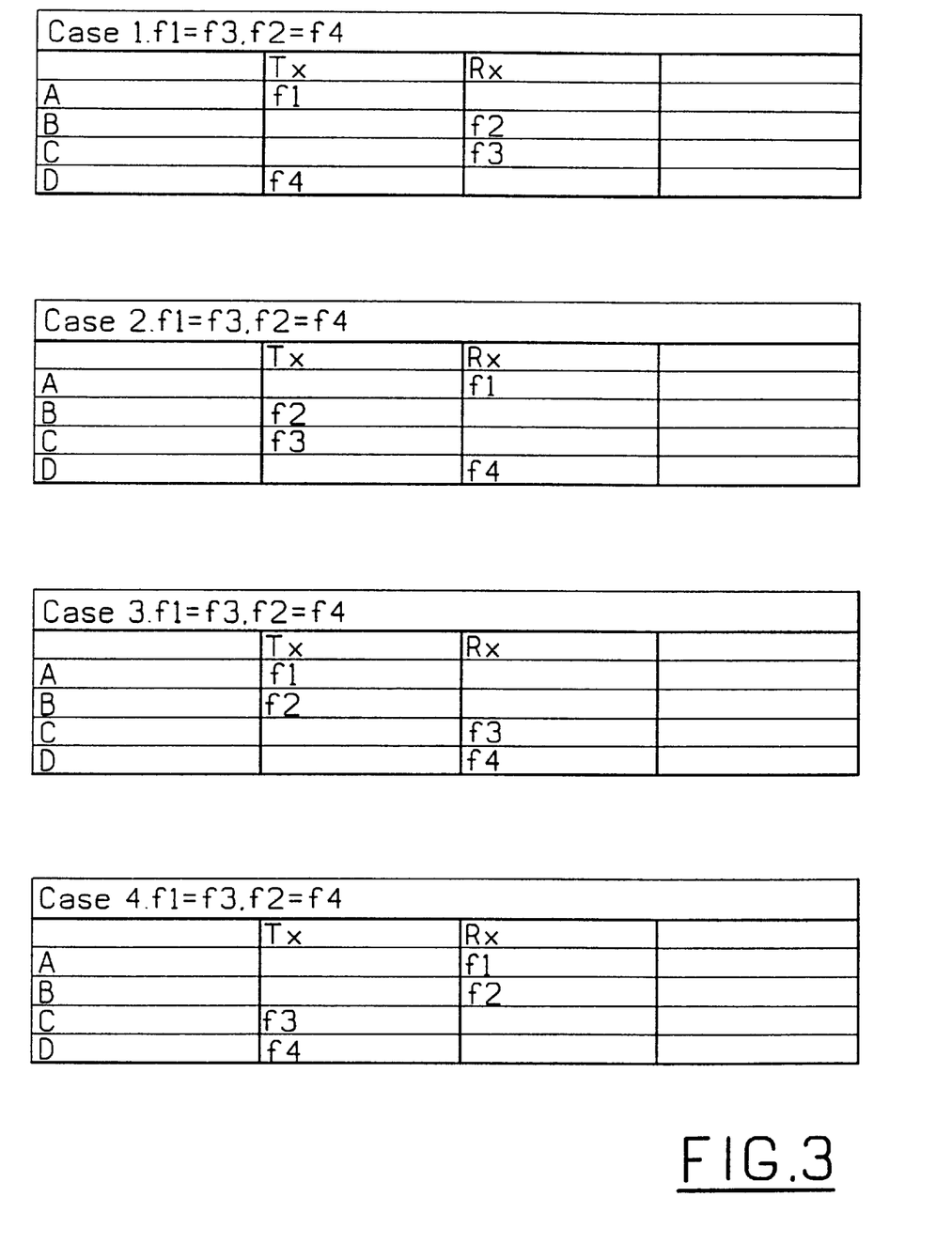
FIG. 3 shows a number of possible ways of utilizing a system with devices according to the invention.

FIG. 3 shows a table of various possible configurations for a system according to the invention. The same frequency designations as above have been used throughout, in other words $f_1$ is the frequency for A, $f_2$ is the frequency for B, $f_3$ is the frequency for C and $f_4$ is the frequency for D.

Figure 4:
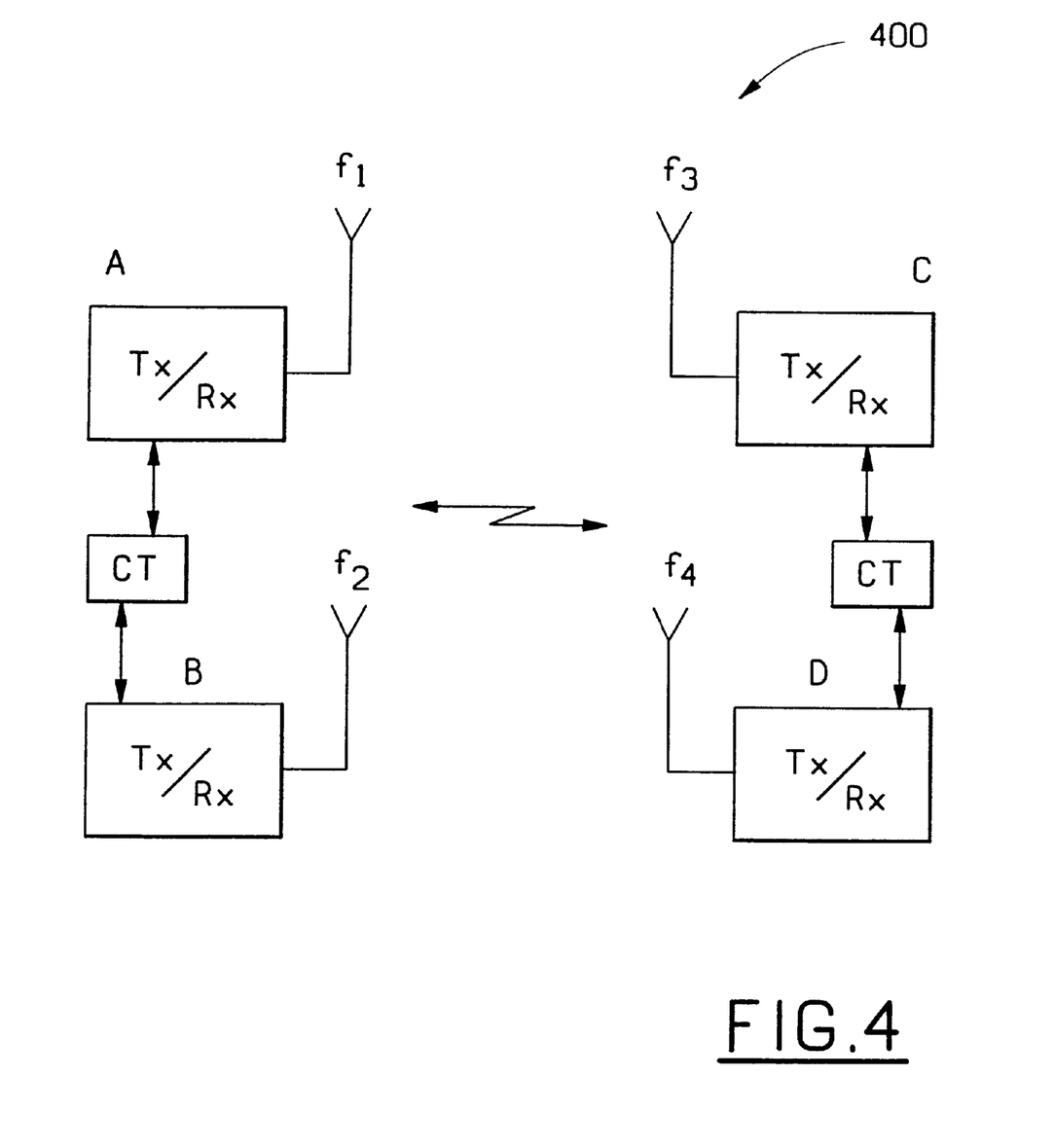
FIGS. 4 and 5 show variants of a system with devices according to the invention.

FIG. 4 shows the system from FIG. 1, now designated 400 and with the addition of a controller CT for each of the two devices A/B and C/D in the system. The function of the controller is to activate/deactivate continually and adaptively over time the transmitter and receiver of the modules A, B, C, D in the respective device. This activation and deactivation can be carried out based on information that is obtained in a large number of ways which will be apparent to experts in the field and will therefore not be described here, but as an example it can be mentioned that the information can be obtained from an external exchange to which the devices send information about their transmission requirements for the next interval(s) of time. Another possibility is that at the commencement of an interval of time each device sends information to the other device, via one or more of its modules, concerning how much information the device needs to transmit during one or more coming intervals of time.

Figure 5:
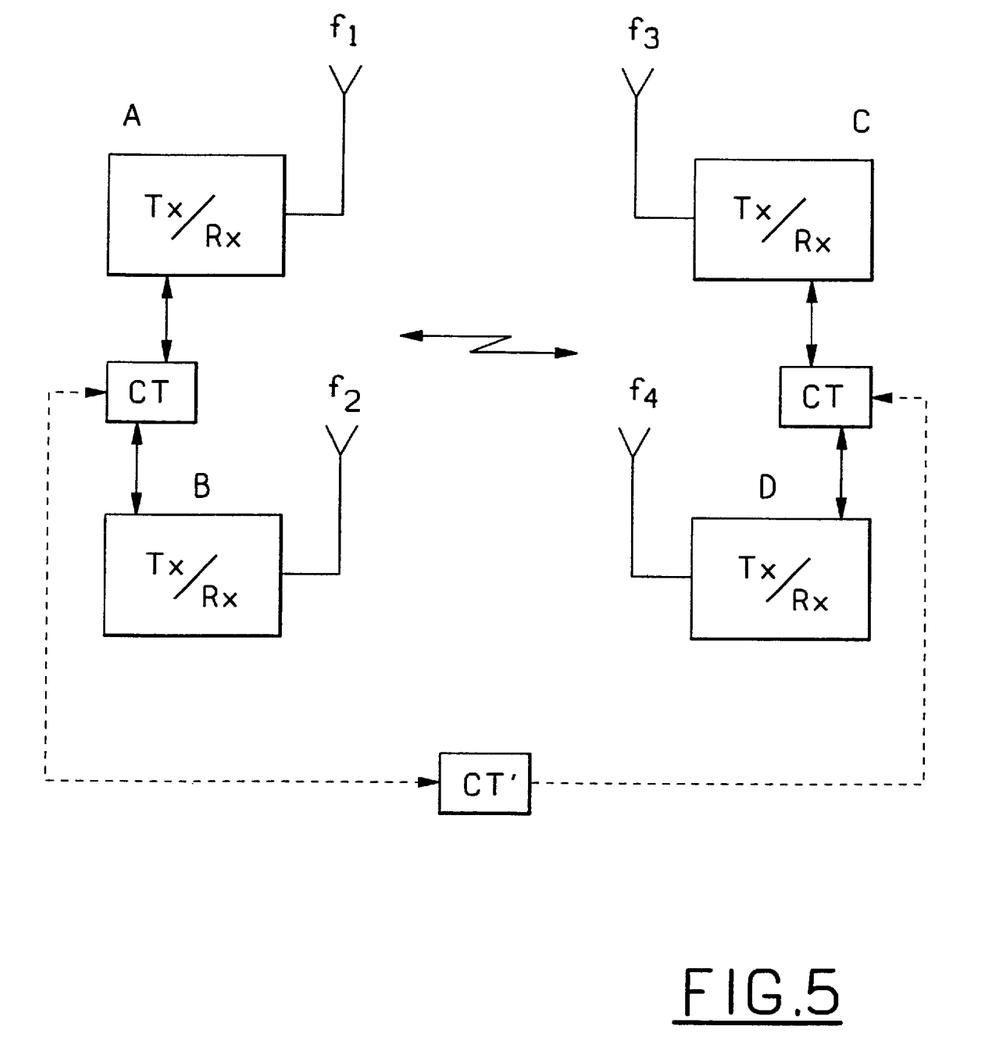

FIG. 5 shows the system from FIG. 4, with the addition of an external controller CT' of the type mentioned above. This external controlling exchange CT' controls the controllers CT that are connected to the various devices in the system, based on information received from the groups, preferably via the controller CT of the respective group.

Figure 6A:
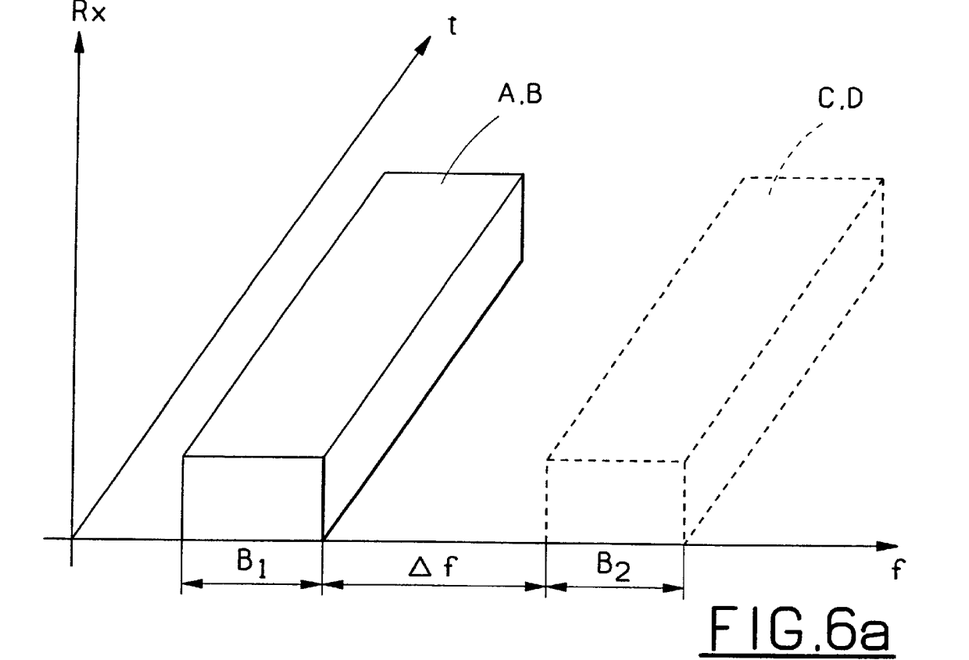
FIGS. 6a and 6b show examples of known technology.
Figure 6B:
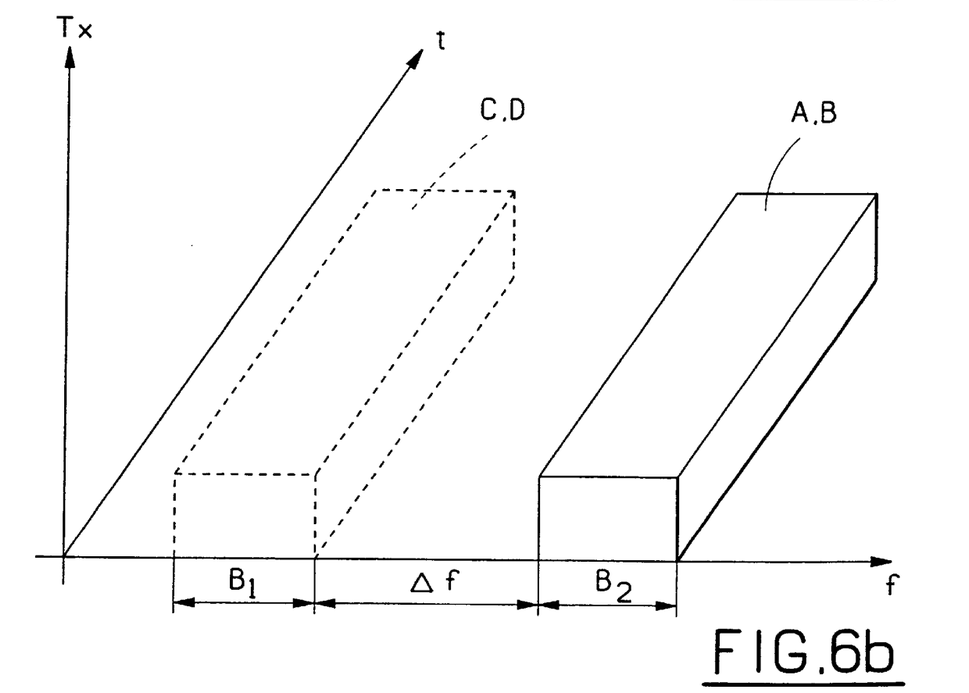

In order to make it easier to understand the invention, FIGS. 6a and 6b show how a traditional communication system with so-called frequency duplex works. Such a system has, in principle, the same construction as the system in FIG. 2, but with the important difference that each of the modules incorporated in such a system is only provided with either a transmitter or a receiver, and with the further difference that the controllers that have been provided according to the invention are not present in the known system.

FIG. 6a shows on a first axis (Rx) the reception of the respective devices A/B; C/D, on a second axis (f) is shown the frequency range and bandwidth for reception for each device, and on a third axis (t) is shown the time. The first device A/B is shown by solid lines, and the second device C/D is shown by broken lines, and as shown in the figure, the first device receives on a frequency range B, and the second device on a frequency range $B_2$, where the two frequency ranges are separated from each other by a so-called duplex distance, $\Delta f$.

FIG. 6b shows on the first axis (Rx) the transmission of the respective devices A/B; C/D, on the second axis (f) is shown the frequency range and the bandwidth on which the transmission is carried out, and on a third axis (t) is shown the time. As shown in the figure, the first device A/B transmits on a frequency range $B_2$ which corresponds to the reception range of the second device C/D and vice versa.

From FIGS. 6a and 6b, it can thus be seen that in traditional systems each device transmits and receives at the same time and the same amount, irrespective of the actual need.

Figure 7A:
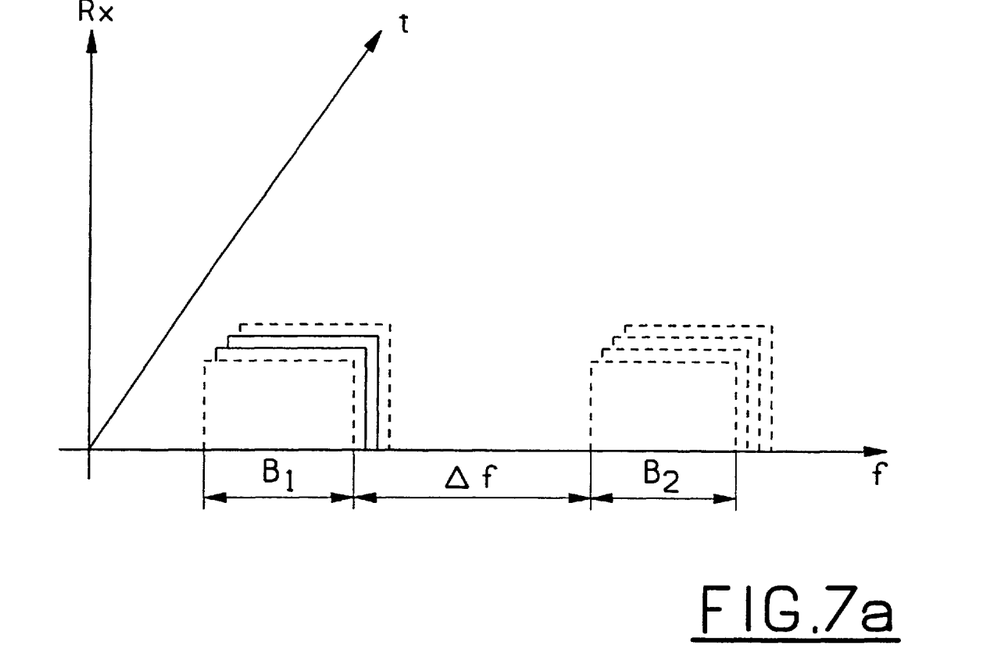
FIGS. 7a and 7b show an example according to the invention for utilization of available bandwidth.
Figure 7B:
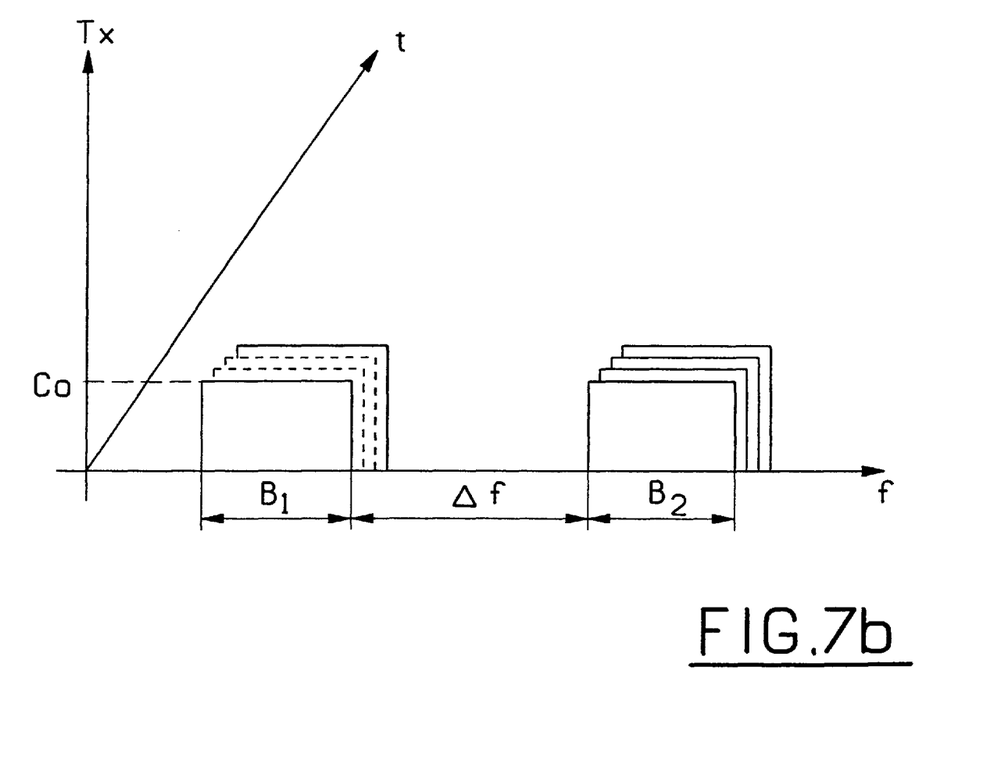

FIGS. 7a and 7b show with three-dimensional diagrams corresponding to those in FIGS. 6a and 6b, how a device A/B; C/D according to the invention can be used in a communication system in order to utilize better the available bandwidth during a particular interval of time, by varying which devices/modules are transmitting or receiving at different times.

On a first axis (Rx) in FIG. 7a is shown which module in the respective device is currently receiving, on a second axis (f) is shown the bandwidth that is reserved for reception, and on a third axis (t) is shown the time. Reception for the modules in the first device A/B is shown by solid lines, and reception for the modules in the second device C/D by broken lines. Correspondingly, it is shown in FIG. 7b which module A, B, C, D in the respective device A/B; C/D is transmitting at the time. Also in FIG. 7b, the first device A/B is shown by solid lines, and the second device C/D by broken lines.

The total time for transmission and reception shown in the diagrams in FIGS. 7a and 7b represents one of the intervals of time that have been described above in association with, for example, FIG. 2, and thus corresponds to $T_1-T_N$ in FIG. 2. On the frequency axis in FIG. 7a are shown two frequency ranges, $B_1$ and $B_2$, separated by a so-called duplex distance, $\Delta f$. The two frequency ranges $B_1$ and $B_2$ are suitably but not necessarily equally large, and each frequency range is utilized by a transmitter and by a receiver.

During the interval of time shown, the need of the first device A/B to transmit information exceeds a particular predetermined level, while at the same time the need of the second device C/D to transmit information is less than a particular predetermined level. On account of this, the interval of time has been divided by the system's controllers into a number of sub-intervals, in the actual example four in number, during which different modules in the different devices transmit or receive. During the first sub-interval, both transmitters in the first device A/B transmit, one on each frequency range $B_1$ and $B_2$ respectively, while at the same time both receivers in the second device C/D receive on the same frequency ranges, one receiver per frequency range.

During the second and third sub-intervals, one of the transmitters in the second device is activated, and transmits on the first frequency range $B_1$, while at the same time one of the transmitters in the second device is activated and transmits on the second frequency range $B_2$. The module in the respective devices that is not transmitting has its receiver activated, which means that during the second and third sub-intervals a transmitter and a receiver is activated in the respective devices.

During the fourth sub-interval, on account of the higher transmission need of the first device, both transmitters in the first device ANB are activated, which accordingly means that both receivers in the second device C/D are activated.

Due to the fact that each module A, B, C, D according to the system has been provided with both transmitter and receiver, and by means of the controllers according to the invention, throughout the whole of the interval of time the first device A/B has been able to transmit for a larger part of the total time than in a traditional system with frequency duplex, where each device can only transmit for 50% of the bandwidth, irrespective of actual need. The fact that the total interval of time in the example in FIGS. 7a and 7b is divided into four sub-intervals is only to be regarded as an example, the total interval of time can, of course, be divided into practically any number of sub-intervals, depending upon the actual need. The invention thus makes it possible to utilize the bandwidth available to the system with great flexibility, in order to meet the actual transmission requirement.

Figure 8:
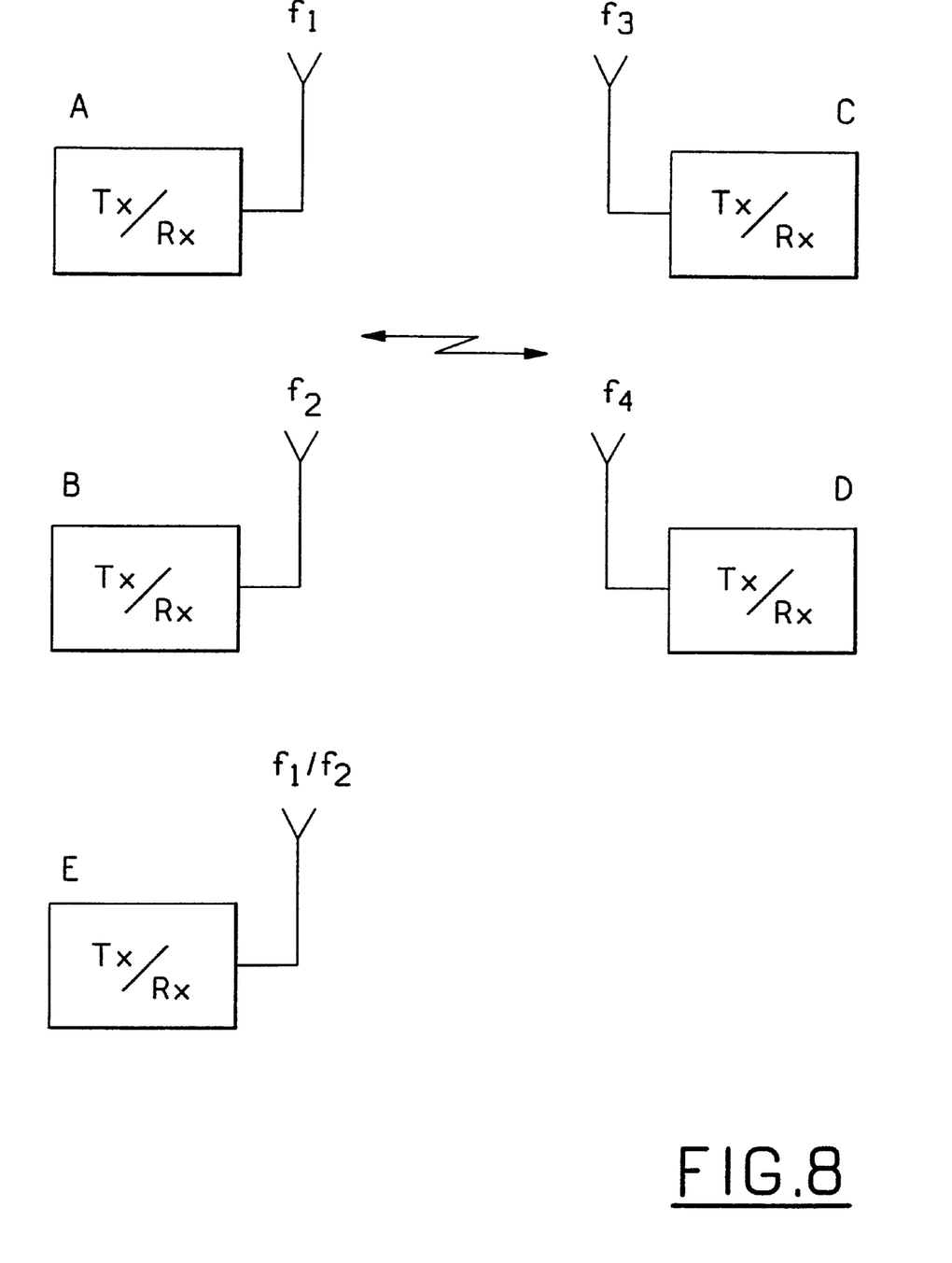
FIG. 8 shows an example of an additional construction of a system according to the invention.

A system according to the invention can, of course, be provided in principle with any number of modules of the type A, B, C, D, with different advantages being obtained. FIG. 8 shows an example of a system of the same basic type that has been described above and shown in FIG. 1, FIG. 4 and FIG. 5. In the system in FIG. 8, the device A/B has, however, been increased by an additional module designated E, which in principle is of the same type as the modules A, B, C, D, in other words the module E is provided with both transmitter and receiver, and can either transmit or receive on a particular frequency, with a particular bandwidth and a particular transmission capacity. Among the advantages that are gained by a system of this type can be mentioned the ability to even out larger imbalances in the transmission requirement than is possible with the systems that have two modules (A/B; C/D), and the ability for the module E to replace any one of the modules A or B if these should become faulty. The module E is therefore suitably arranged in such a way that it can be caused to operate on either the same frequency as the module A-$f_1$, or on the same frequency as the module B-$f_2$.

Figure 9:
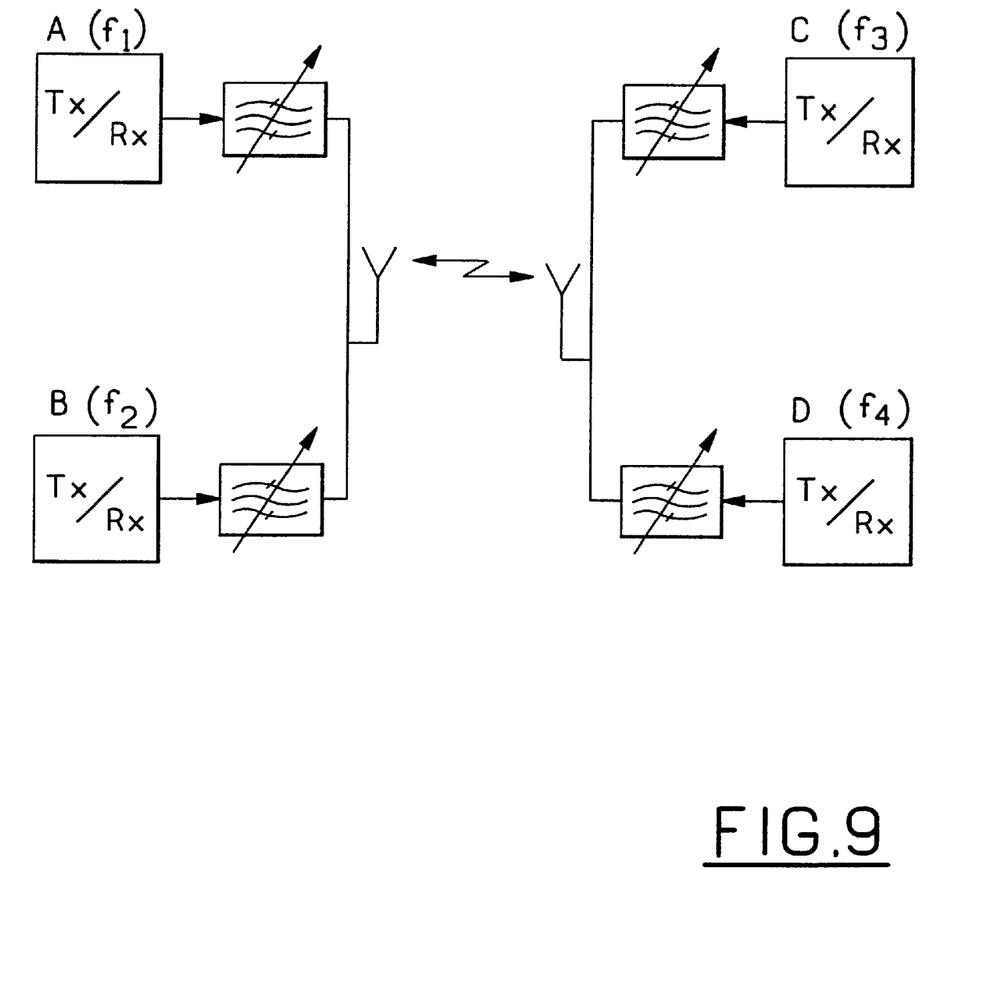
FIG. 9 shows a variant of devices according to the invention.

FIG. 9 shows an additional capability that can be incorporated in modules in a system according to the invention: A transmitter or receiver is usually provided with a bandpass filter which only allows through a required frequency range. If there is a requirement to be able to control the frequency ($f_1$, $f_2$, $f_3$, $f_4$) at which a module (A, B, C, D, E) operates, it should be possible also to control the pass band of the bandpass filter, in other words to be able to move the mid frequency of the pass band. The modules in FIG. 9 have been provided with such variable bandpass filters between the transmission/reception modules and antennas. As shown in FIG. 9, the modules (A/B) in a device can share one and the same antenna, or alternatively, as shown in FIG. 1, FIG. 4 and FIG. 5, they can each have a separate antenna.

This invention is not limited to the examples of embodiments described above, but can be varied freely within the scope of the following patent claims.

What is claimed is:

1. A first communication device (A/B) for wireless communication with a second communication device (C/D), which first device is provided with means for simultaneously transmitting (A) on a first frequency and receiving (B) on a second frequency, characterized in that the first device (A/B) is provided with means for, in cooperation with corresponding means in the second (C/D) device, and based on the need of each device to transmit information within a particular time interval, divide said time interval into a number of sub-intervals, the first device being provided with means for simultaneously receiving on both the first and the second frequencies.

2. A first communication device according to claim 1, provided with means for informing a second device about how much traffic the first device needs to transmit to the second device during a particular interval of time.

3. A communication device according to claims 2, further provided with a variable bandpass filter which can be connected between the transmitter/receiver modules and an antenna.

4. A communication device according to claim 1, further provided with a variable bandpass filter which can be connected between the transmitter/receiver modules and an antenna.

5. A first communication device (A/B) for wireless communication with a second communication device (C/D), which first device is provided with means for simultaneously transmitting (A) on a first frequency and receiving (B) on a second frequency, characterized in that the first device (A/B) is provided with means for, in cooperation with corresponding means in the second (C/D) device, and based on the need of each device to transmit information within a particular time interval, divide said time interval into a number of sub-intervals, the first device being provided with means for simultaneously transmitting on both the first and the second frequencies.

6. A first communication device according to claim 5, provided with means for informing a second device about how much traffic the first device needs to transmit to the second device during a particular interval of time.

7. A communication device according to claims 6, further provided with a variable bandpass filter which can be connected between the transmitter/receiver modules and an antenna.

8. A communication device according to claims 5, further provided with a variable bandpass filter which can be connected between the transmitter/receiver modules and an antenna.

9. A system for wireless communication, comprising a first (A/B) and a second (C/D) communication device intended to transmit information to each other, where each device (A/B; C/D) comprises means for simultaneously transmitting on a first frequency and receiving on a second frequency, characterized in that both the first (A/B) and the second (C/D) device are provided with means for, in cooperation with each other, and based on the need of each device to transmit information during a particular time interval, divide said time interval into a number of sub-intervals, the first device comprising means (ANB) for simultaneously transmitting on both the first and the second frequencies within the said sub-intervals and the second device (C/D) comprising means for simultaneously receiving on both the first and the second frequencies within the said sub-intervals.

10. A communication system according to claim 9, in which the first and the second communication devices are provided with means for informing each other about their need to transmit information during a particular interval of time.

11. A method for utilizing the available bandwidth in a wireless communication system that comprises a first (A/B) and a second (C/D) communication device intended to transmit information to each other, where each device (A/B; C/D) can simultaneously transmit on a first frequency and receive on a second frequency, characterized in that, based on the need of the respective devices to transmit information within a particular interval of time, the said interval of time is divided up into a number of subintervals, the first device simultaneously transmitting on both the first and the second frequencies within a number of the said sub-intervals, and the second device simultaneously receiving on both the first and the second frequencies during these sub-intervals.

12. A method according to claim 11, according to which information about the need of the respective devices to transmit information within a particular interval of time is transmitted between the devices.

\* \* \* \* \*